(12) United States Patent
Satoh et al.

(10) Patent No.: US 6,251,259 B1
(45) Date of Patent: Jun. 26, 2001

(54) METHOD AND APPARATUS FOR PRODUCING ELECTROLYZED WATER

(75) Inventors: Fumitake Satoh; Kazuyoshi Arai; Tomoyuki Yanagihara; Tatsuya Naitoh, all of Kanagawa-ken (JP)

(73) Assignee: MIZ Co., Ltd., Fujisawa (JP)

( * ) Notice: Subject to any disclaimer, the term of this patent is extended or adjusted under 35 U.S.C. 154(b) by 0 days.

(21) Appl. No.: 09/284,483

(22) PCT Filed: May 27, 1998

(86) PCT No.: PCT/JP98/02324

§ 371 Date: Apr. 22, 1999

§ 102(e) Date: Apr. 22, 1999

(87) PCT Pub. No.: WO99/10286

PCT Pub. Date: Mar. 4, 1999

(30) Foreign Application Priority Data

Aug. 27, 1997 (JP) .................................... 9-246060

(51) Int. Cl.[7] .............................. C25B 15/00; C02F 1/461
(52) U.S. Cl. ...................... 205/744; 205/746; 204/229.6; 204/252
(58) Field of Search ..................... 204/252, 282, 204/253, 229.6, 257; 205/742, 746, 744

(56) References Cited

U.S. PATENT DOCUMENTS

| 4,908,109 | * | 3/1990 | Wright ............................... 205/744 X |
| 5,015,354 | * | 5/1991 | Nishiki et al. .................... 204/282 X |
| 5,304,289 | * | 4/1994 | Hayakawa ......................... 205/744 X |
| 5,853,562 | * | 12/1998 | Eki et al. ....................... 204/229.6 X |

FOREIGN PATENT DOCUMENTS

| 7-331475 | 12/1995 | (JP) . |
| 8-74082 | 3/1996 | (JP) . |
| 9-28769 | 2/1997 | (JP) . |

* cited by examiner

*Primary Examiner*—Donald R. Valentine
(74) *Attorney, Agent, or Firm*—Arent Fox Kintner Plotkin & Kahn, PLLC

(57) ABSTRACT

An electrolytic cell capable of controlling the pH and the ORP independently to each other, comprising an electrolytic chamber (113) to which subject water to be electrolyzed are supplied, membranes (115, 115) provided on the both side walls of the electrolytic chamber, a pair of electrode plates (116, 117) respectively provided inside the electrolyzed chamber and outside the electrolytic chamber sandwiching the membrane therebetween, and wherein the electrode plate (116) is provided outside the electrolytic chamber in contact with the membrane (115) or leaving a slight space.

10 Claims, 13 Drawing Sheets

METHOD AND APPARATUS FOR PRODUCING ELECTROLYZED WATER

This application is a 371 of PCT/JP98/02324, May 27, 1998.

TECHNICAL FIELD

The present invention relates to an electrolytic cell and an apparatus for producing reducing electrolyzed water and other electrolyzed water favorable to be used as potable water, drip solutions and other injections.

BACKGROUND ART

It has been reported that electrolyzed alkaline water derived by electrolyzing subject water produces the medical effects that extraordinary zymosis and indigestion in the stomach and intestines, diarrhea and gastric hyperacidity are suppressed. The medical effects have been considered to be produced principally by such mineral components contained in electrolyzed alkaline water and present as cations as calcium, sodium, magnesium and potassium. Electrolyzed alkaline water used for obtaining such medical effects is exclusively defined being subjected to metal ions contained therein and the pH, and produced by electrolyzing subject water to which calcium, and the like are added until the pH reaches about 9 or more.

However, disease is mainly caused by the damage of biomolecules within an organism resulting from oxidation of the biomolecules with active oxygen formed therein, and such active oxygen can be reduced with hydrogen to form non-toxic water. By promoting the reaction, higher medical effects can be obtained, and the applicants of the present application found through their study that it is preferable to use electrolyzed water of a minus oxidation-reduction potential (ORP) and the absolute value is large (for example the ORP is 300 mV or less).

When using electrolyzed water having a reducing property of this kind as potable water, drip solutions, injections, dialysis solutions, etc., it is desired that the pH is maintained to be as neutral as possible. The conventional apparatus for producing electrolyzed water, however, was not able to produce electrolyzed water having a neutral pH and an oxidation-reduction potential in minus a little. Namely, when electrolyzing subject water by the conventional apparatus for producing electrolyzed water, a pH and an ORP correlationally changed. When the pH was heighten to about 10, the ORP fell to about −500 mV, while in the case of electrolyzed water having a pH close to neutral, such as 6 to 8, the ORP fell only to about 150mV even at minimum. Namely, in the conventional apparatus for producing electrolyzed water, the pH and the ORP were not able to be controlled independently to each other.

DISCLOSURE OF INVENTION

The present invention has been made in consideration of the above problem of the related art and has as an object thereof to provide an electrolytic cell and apparatus for producing electrolyzed water capable of controlling a pH and an ORP independently to each other.

[1] To attain the above object, an electrolytic cell of the present invention, comprising:

an electrolytic chamber to which subject water is supplied, and at least a pair of electrode plates respectively provided inside said electrolytic chamber and outside said electrolytic chamber sandwiching a membrane therebetween; and the electrolytic cell, wherein the electrode plate outside said electrolytic chamber is provided in contact with the membrane or leaving a slight space.

In the electrolytic cell of the present invention, a pair of electrode plates sandwiching a membrane therebetween are respectively provided inside and outside the electrolytic chamber, and one of the electrode plates is provided outside the membrane being in contact with the membrane or leaving a slight space therebetween. Electrolysis is carried out by flowing a current to the pair of electrode plates, while feeding the subject water to the electrolytic chamber.

Here, between the pair of electrode plates sandwiching the membrane, especially between the electrode plate outside the electrolytic chamber and the membrane, lies subject water due to water content characteristics of the membrane and capillarity between the electrode plate and the membrane, so that a current flows between the electrode plates.

The chemical reaction at this time will be explained in a case where the electrode plate inside the electrolytic chamber is an anode and the electrode plate outside the electrolytic chamber is a cathode.

First, when a direct current (DC) voltage is applied to the pair of electrode plates, the reaction of $$2H_2O + 2e^- \rightarrow 2OH^- + H_2\uparrow \qquad (1)$$

arises on the surface of the cathode plate inside the electrolytic chamber. And the reaction of $$H_2O - 2e^- \rightarrow 2H^+ + \tfrac{1}{2} \cdot O_2\uparrow \qquad (2)$$

arises on the surface of the electrode plate outside the electrolytic chamber over the membrane, that is, between the electrode plate and the membrane.

In the electrolytic cell of the present invention, since the membrane and the electrode plate (anode) outside the electrolytic chamber are almost in contact with each other, $H^+$ ion (actually, existing in the form of oxonium $H_3O^+$) in the above formula (2) generated between them strongly react against on the anode plate. Therefore, relatively large electric power is applied in the membrane direction. As a result, the $H^+$ ion passes the membrane as being permeated in the same, and a part of the $H^+$ ion receives electron $e^-$ from the cathode plate, becomes hydrogen gas as in the formula (3) below, and dissolved into the produced electrolyzed water on the cathode side.

$$2H^+ + 2e^- \rightarrow H_2\uparrow \qquad (3)$$

As a result, the electrolyzed water produced on the cathode side (that is, inside the electrolytic chamber) has a lower oxidation-reduction potential (ORP) than ordinary cases (which is the electrolyzed water having a minus ORP of a high absolute value, and hereinafter also referred to as electrolyzed reducing water).

Note that the residual $H^+$ ion passed through the membrane is reduced to water by reacting with $OH^-$ ion in the electrolytic chamber ($2H^+ + OH^- \rightarrow H_2O$), so that the pH of the electrolyzed reducing water produced in the electrolytic chamber becomes a little close to neutral.

[2] In the electrolytic cell of the present invention, when the membrane and a pair of electrode plates are provided at least two sets, at least two electrode plates are provided inside the electrolytic chamber, thus, the reaction of the above formula (1) is proceeded also between the electrode plates of the same polarity. Accordingly, comparing with the case of providing a pair of electrode plate sandwiching the membrane therebetween, the electrolysis reaction area per unit volume increases. Therefore, the efficiency of the electrolysis improves and the electrolytic cell can be configured to be compact.

Also, in the electrolytic cell of the present invention, the membrane and the electrode plate (anode) outside the electrolytic chamber are provided being almost in contact with each other and only the water lies between the membrane and the electrode plate outside the electrolytic chamber becomes conductive medium. Therefore, the oxygen gas generated in the above formula (2) is emitted into the air as it is. Accordingly, comparing with a so-called non-membrane type electrolysis, dissolved oxygen content in the produced electrolyzed water becomes remarkably small, and, furthermore, the oxidation-reduction potential becomes low.

At the same time, when the $H^+$ ion and oxygen gas on the right side of the equal sign in the above formula (2) are discharged from between the membrane and the electrode plate outside the electrolytic chamber, there is a tendency that the reaction in the right direction of the formula (2) becomes active in terms of chemical balancing. As a result, an electron supplying capacity from the cathode plate to water molecules $H_2O$ and an electron receiving capacity to receive water molecules $H_2O$ of the anode plate are activated, so that the conductive capacity is not reduced even when the electrolysis is carried out for a long time and stabilized electrolyzed water can be obtained.

In the electrolytic cell of the present invention, when the membrane and a pair of electrode plates are provided at least two sets, at least one of the electrode plates outside the electrolytic chamber provided at least two is preferably provided in the second electrolytic chamber. Electrolysis is carried out by respectively flowing a current to the respective two pairs of electrode plates while supplying the subject water (electrolyte may be added in accordance with need) to the second electrolytic chamber and supplying the same to the above original electrolytic chamber (hereinafter, also referred to as a first electrolytic chamber for convenience).

Here, a case where the electrode plate in the first electrolytic chamber is a cathode plate and the electrode plate outside the first electrolytic chamber is anode plate will be explained as an example. In the electrolysis carried out between the anode plate provided inside the second electrolytic chamber and the corresponding cathode plate making a pair, since sufficient subject water is supplied to both the electrolytic chambers, the pH rises, the ORP lowers, and furthermore, mineral components are condensed in the electrolyzed water produced near the cathode plate.

Contrary to this, in the electrolysis carried out between the other anode plate and the corresponding cathode plate making a pair, since the chamber provided with the anode plate is open to the air, although the pH of the electrolyzed water produced near the cathode plate does not rise much and the mineral components are unchanged, the ORP reduces due to the reasons above.

Generally, since an ORP of electrolyzed water can be made lower more easily, when a pH is higher, it is advantageous to make the pH higher when producing electrolyzed water having a larger reduction potential is desired.

Since a pair of electrode plates having different property values exist within one electrolytic chamber for producing electrolyzed water, by properly controlling the pair of electrode plates in accordance with need, a pH and an ORP can be controlled without being affected by difference of water quality (the pH and ORP) of the subject water.

In this case, a degree of free combination of a pH and an ORP can be heightened by providing an electrolytic cell, comprising: a first electrolytic cell having a first electrolytic chamber and a second electrolytic chamber filled in by subject water and separated by a membrane and at least a pair of electrode plates sandwiching the membrane therebetween respectively provided in the first electrolytic chamber and the second electrolytic chamber; a second electrolytic cell having a third electrolytic chamber to which electrolyzed water produced in the first electrolytic chamber of the first electrolytic cell, at least a pair of electrode plates sandwiching a membrane therebetween respectively provided inside of the third electrolytic chamber and outside of the third electrolytic chamber; and the electrolytic cell wherein the electrode plate outside of the third electrolytic chamber is provided in contact with the membrane or leaving a slight space.

[3] It is not limited to the electrolytic cell of the present invention, however, as a reverse descaling method, for example, it is preferable that the power source circuit has a reverse electrolysis descaling circuit for carrying out a first reverse electrolysis descaling by applying a voltage of either one of an anode or a cathode to one of the electrode plates provided outside of the electrolytic chamber, and simultaneously applying a voltage of the other one of the anode or the cathode to the other one of the electrode plates, and thereafter, carrying out a second reverse electrolysis descaling by reversing the polarity of the applying voltage to the electrode plates. At this time, it is not specifically limited, however, it is preferable that a voltage is not applied to the electrode plate outside the electrolytic chamber during the first and second reverse electrolysis descaling.

An ordinary method of reverse electrolysis descaling is to simply reverse the applying polarity, and an anode polarity is applied to the electrode plate, to which a scale is adhered by being applied a cathode polarity till then, in order to electrically flow out the adhered scale. Accordingly, such a method of reverse electrolysis descaling can be adopted to the above electrolytic cell of the present invention.

However, even during the reverse electrolysis descaling, scale adheres to the electrode plates which is being applied a cathode polarity. In the above electrolytic cell of the present invention, it is difficult to remove the once adhered scale because the subject water is not supplied to the electrode when transferred to the regular electrolysis, and the anode polarity is applied to the electrode. Therefore, by using the at least two electrode plates provided in the first electrolytic chamber, the scale adhered to the electrode plates is removed by flowing a current for reverse electrolysis descaling only to these electrode plates.

In this way, scale is not adhered to the electrodes provided outside the first electrolytic chamber and the reverse electrolysis descaling can be conducted by flowing a current only to the electrode plates provided inside the first electrolytic chamber. Therefore, half amount of power becomes sufficient, or the duration for reverse electrolysis descaling can be reduced to half with the same amount of current.

[4] The above electrolytic cell of the present invention can be used independently, however, it may be configured as an apparatus for producing electrolyzed water, comprising: a plurality of electrolytic cells, a water supply system for letting in the subject water in parallel to the respective electrolytic chambers of the electrolytic cell, and a water sluice system for letting out in parallel the electrolyzed water generated in the respective electrolytic chambers.

In the electrolytic cell and an apparatus for producing electrolyzed water of the present invention, electrode plates outside the electrolytic chamber are provided being in contact with the membrane or leaving a slight space. This idea includes forming the electrode plates on the surface of the membrane.

The membrane used in the electrolytic cell and an apparatus for producing electrolyzed water of the present invention is not specifically limited, however, a porous membrane, an ion-exchange membrane (cation-exchange membrane or anion-exchange membrane) etc. can be raised. To sum up, the membrane of the present invention may be anything as far as it has porous characteristics and water content characteristics to allow water molecules to pass through it.

Also, in the electrolytic cell and an apparatus for producing electrolyzed water of the present invention, other conductor and semiconductor can be stacked on the principal surface facing to the membrane of the electrode plates. The electrode plates of the present invention also includes these.

Purpose for using the electrolyzed water produced by the electrolytic cell and an apparatus for producing electrolyzed water of the present invention is not specifically limited, and can be applied for a wide range of various fields of medical treatment, foods, agriculture, industry, etc. in addition to potable water and medical use.

Note that the electrolyzed water obtained by the electrolytic cell and an apparatus for producing electrolyzed water of the present invention is characterized in that the value of the oxidation-reduction potential does not depend on a pH. Therefore, in the present specification, the electrolyzed water produced by the cathode side will be referred to as electrolyzed reducing water not as alkaline electrolyzed water and the electrolyzed water produced by the anode side will be referred to as electrolyzed oxidizing water not as acidic electrolyzed water.

BEST MODE FOR CARRYING OUT THE INVENTION

Below, the preferred embodiment of the present invention will be explained based on the drawings.

[First Embodiment]

Figure 1:
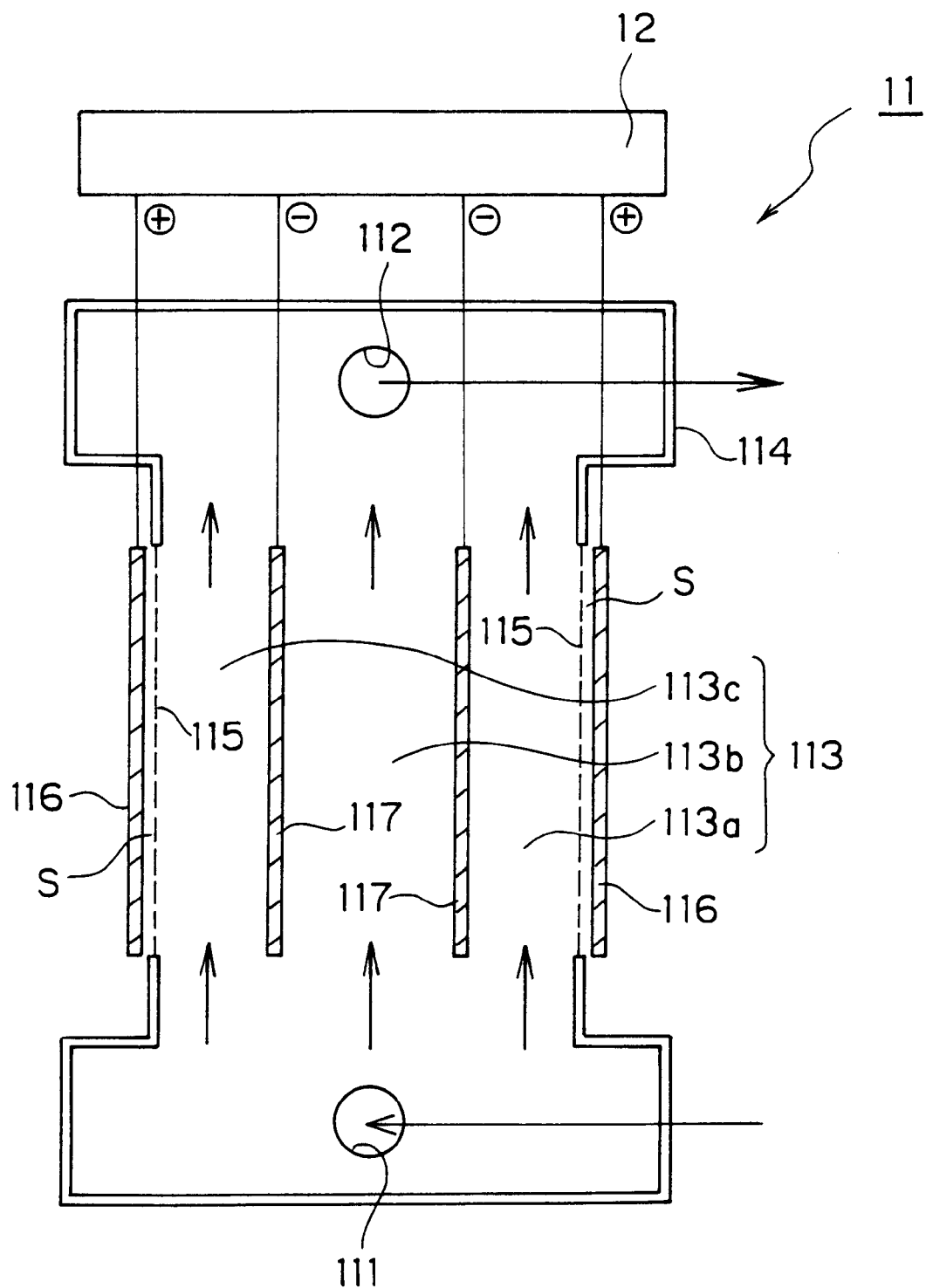
FIG. 1 is a cross-sectional view of a first embodiment of the present invention.

FIG. 1 is a vertical cross-sectional view of a first embodiment of the present invention which shows the basic configuration of the electrolytic cell of the present invention.

In the electrolytic cell 11 of the present invention, an inlet 111 for letting in the original water and an outlet 112 for letting out the electrolyzed water are formed and an electrolytic chamber 113 is formed between the inlet 111 and the outlet 112. In the electrolytic cell 11 of the present example, the inlet 111 is formed in order that the subjected water flows in the vertical direction with respect to the illustrated paper surface at the bottom of a casing 114, and the outlet 112 is formed in order that the electrolyzed water is sluiced out in the vertical direction with respective to the illustrated paper surface at the top surface of a casing 114.

Also, porous films 115 are provided on the right and left side walls of the electrolytic chamber 11, and electrode plates 116 are respectively provided for the porous films 115 outside the electrolytic chamber in a contact state. The other electrode plates 117 are provided inside the electrolytic chamber 113 in order that the primary surfaces respectively face to each of the electrode plates 116.

The two sets of electrode plates 116 and 117 are connected with a direct current (DC) power source 12. An anode polarity is applied to one of the one pair of mutually facing electrode plates 116 and 117 sandwiching the membrane 115 therebetween and a cathode polarity is applied to the other electrode plate. For example, when generating electrolyzed reducing water in the electrolytic chamber 113, as shown in FIG. 1, the cathode of the DC power source is connected to the electrode plate 117 provided in the electrolytic chamber 113, and the anode is connected to the electrode plate 116 provided outside the electrolytic chamber 113.

Note that when generating electrolyzed oxidizing water in the electrolytic chamber 113, the anode of the DC power source may be connected to the electrode plate 117 provided inside the electrolytic chamber 113 and the cathode may be connected to the electrode plate 116 provided outside the electrolytic chamber 113.

The membrane 115 used in the present embodiment is preferably has characteristics that it easily permeates the water flowing into the electrolytic chamber 113, at the same time, the permeated water is hard to drip. Namely, in the electrolytic cell 11 of the present embodiment, during the electrolysis, a water film is formed in the membrane 115 itself and in the slight space S between the membrane 115 and the electrode plate 116, and the current flows to both the electrode plates 116 and 117 via the water film. Accordingly, it becomes important for improving the electrolysis efficiency that the water composing this water film is successively exchanged. Also, if the water permeated in the membrane 115 leaks from between the membrane 115 and the electrode plate 116, processing to deal with it is required. Therefore, it is preferable that the membrane 115 has water content characteristics to a degree that the permeated water does not leak.

As one example of the membrane 115, a porous film formed by unwoven polyester or polyethylene screen as a core part and chlorinated ethylene or poly-fluorinate bynilyden and titanium oxide or poly-vynil chloride as film materials, having the thickness of 0.1 to 0.3 mm, an average diameter of the porous being 0.05 to 1.0 $\mu$m, and the permeable water amount of not more than 1.0 cc/cm2·min. can be raised as an example.

Figure 14:
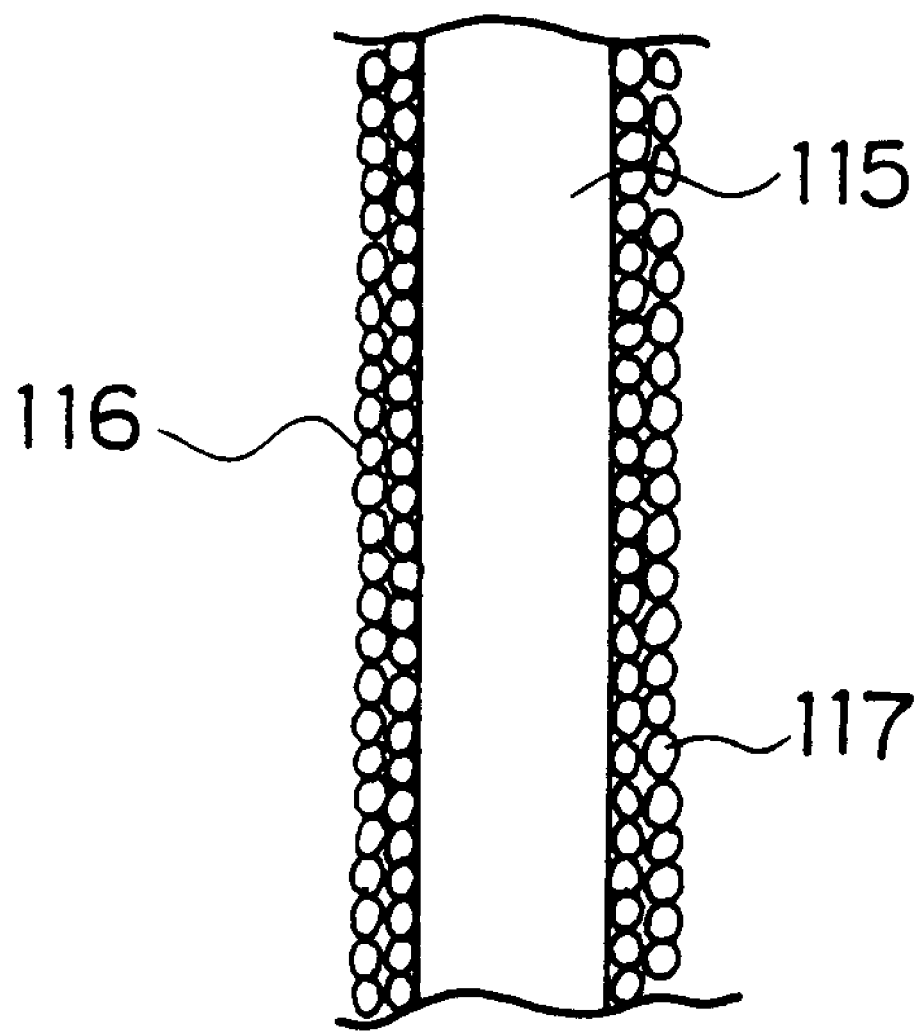
FIG. 14 is a cross-sectional view of an another example of the membrane and the electrode according to the present invention.

On the other hand, a distance between a pair of mutually facing electrode plates 116 and 117 arranged to sandwich the membrane 115 is 0 mm to 5.0 mm, more preferably, 1.5 mm. Here, the distance between the electrode plates 116 and 117 being 0 mm indicates the case of using a zero gap electrode, for example as shown in FIG. 14, wherein the electrode films are directly formed respectively on both primary surfaces of the membrane 115, and it means that substantially there is a distance of the thickness of the membrane 115. In the zero gap electrode, electrode may be formed only on one primary surface of the membrane 115. Also, when adopting such a zero gap electrode, it is preferable that holes or a space is provided on the electrode plates 116 and 117 for letting out the gas generated on the electrode surfaces to the back side which is the opposite of the membrane 115.

The distance between the electrode plates 117 and 117 provided inside the electrolytic chamber 113 is not specifically limited, however, it is 0.5 mm to 5 mm, more preferably, 1 mm.

When generating electrolyzed reducing water by using such an electrolytic cell 11, first, the cathode (−) of the DC power source 12 is connected to the two electrode plates 117 and 117 provided inside the electrolytic chamber 113, the anode (+) of the DC power source 12 is connected to the electrode plates 116 and 116 outside the electrolytic chamber 113, and a voltage is applied to two pairs of the mutually facing electrode plates 116 and 117 sandwiching the membrane 115. Then, when water, such as tap water, is supplied from the inlet 111, the tap water is subjected to electrolysis in the electrolytic chamber 113, and the reaction of the above formula (1) occurs on the surface of the electrode plates 117 and the around. The reaction of the above formula (2) occurs on the surface of the electrode plate 116 outside the electrolytic chamber 113 over the membrane 115, that is, between the electrode plates 116 and the membrane 115.

This $H^+$ ion passes the membrane 115 as being permeated therein, and a part of it receives the electron $e^-$ from the cathode plate 117 to become hydrogen gas and dissolved in the generated electrolyzed water on the cathode side. Due to this, the electrolyzed water generated on the cathode side (that is, inside the electrolysis chamber 113) becomes electrolyzed reducing water having a lower oxidation-reduction potential (ORP) than ordinary cases.

Since the residual $H^+$ ion passed through the membrane 115 reacts with $OH^-$ ion in the electrolytic chamber 113 and is reduced to water, the pH of the electrolyzed reducing water generated in the electrolytic chamber 113 becomes a little close to neutral. Namely, electrolyzed reducing water having a not very high pH and a low ORP can be obtained. In this way, the electrolyzed reducing water including the generated hydroxide ion is supplied from the outlet 112.

When continuing the electrolysis by using tap water as electrolyzing subject water, calcium ion and magnesium ion included in the tap water precipitate on the surface of the cathode plate 117, becomes a scale and causes deterioration of the electrolysis efficiency. Therefore, so called reverse electrolysis descaling is carried out to remove the scale precipitated on the cathode plate 117 after performing electrolysis for a certain period of time. In the electrolytic cell 11 of the present embodiment, the reverse electrolysis descaling is carried out in certain intervals.

As the simplest method of the reverse electrolysis descaling, it is considered to simply reverse the polarity applied hitherto. Namely, to explain in the above case of generating the alkaline electrolyzed water, while, connecting the anode (+) of the DC power source 12 to the two electrode plates 117 and 117 provided inside the electrolytic chamber 113, connecting the cathode (−) of the DC power source 12 to the electrode plates 116 and 116 provided outside the electrolysis chamber 113, and a voltage is applied to the two pairs of mutually facing electrode plates 116 and 117 sandwiching the membrane 115. As a result, at the electrode plates 117 being adhered by scale due to the application of cathode, the adhered plus metal ion is flown out in the tap water by being applied an anode and discharged from the outlet 112.

In the electrolytic cell of the present invention, the explained reverse electrolysis descaling method can be of course adopted, as well, however, when applying a cathode to the electrode plate 116 provided outside the electrolytic chamber 113, scale is precipitated on the electrode plate 116 during the reverse electrolysis descaling. Therefore, in the electrolytic cell having the configuration shown in FIG. 1, it becomes difficult to remove the scale precipitated on the electrode plate 116 during the regular electrolysis performed next. If this is continued, the scale precipitated on the electrode plate 116 gradually increases to bring a fear that the electrolysis efficiency declines.

Figure 2:
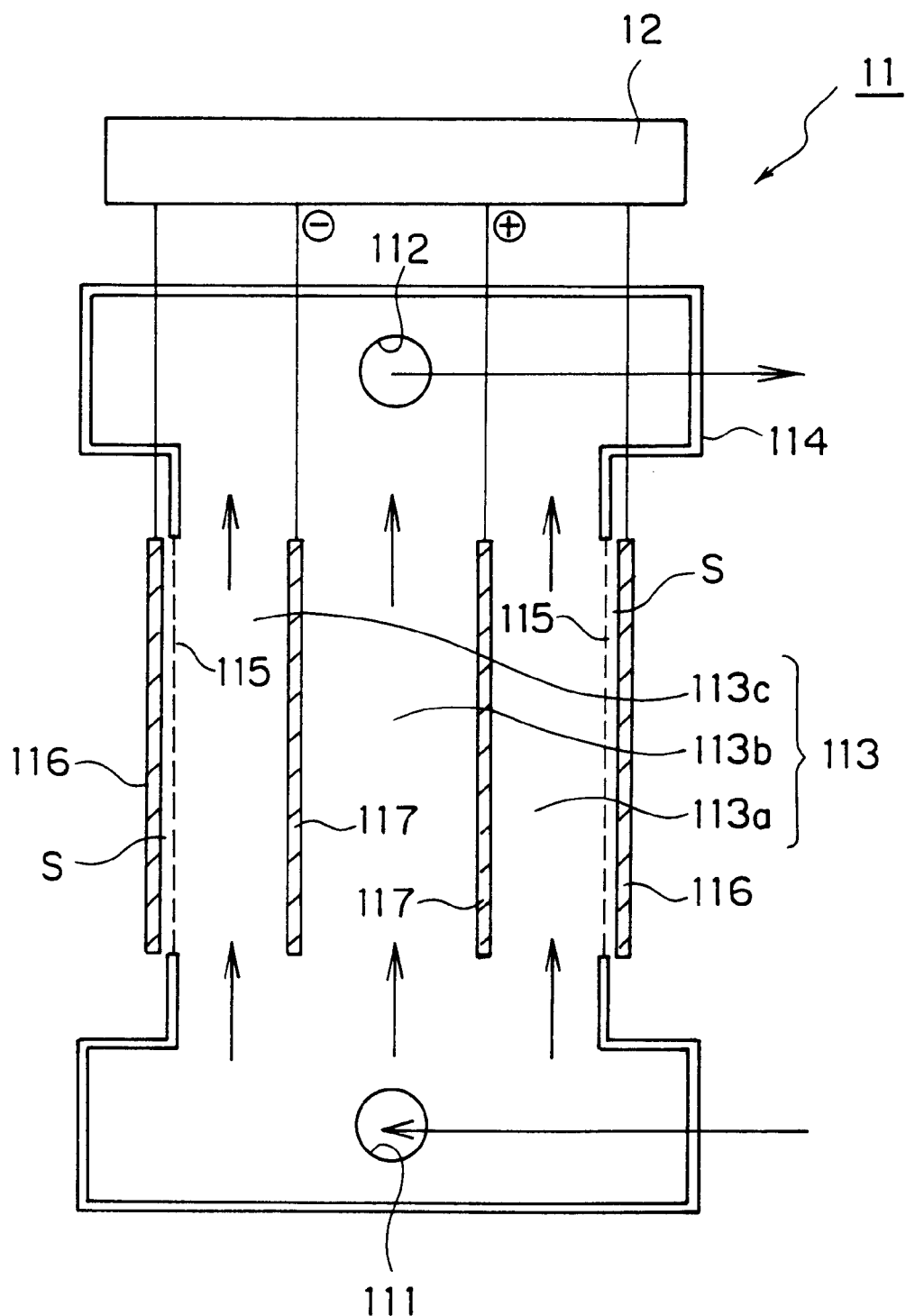
FIGS. 2 and 3 are cross-sectional views for explaining a reverse electrolysis descaling method of the first embodiment.
Figure 3:
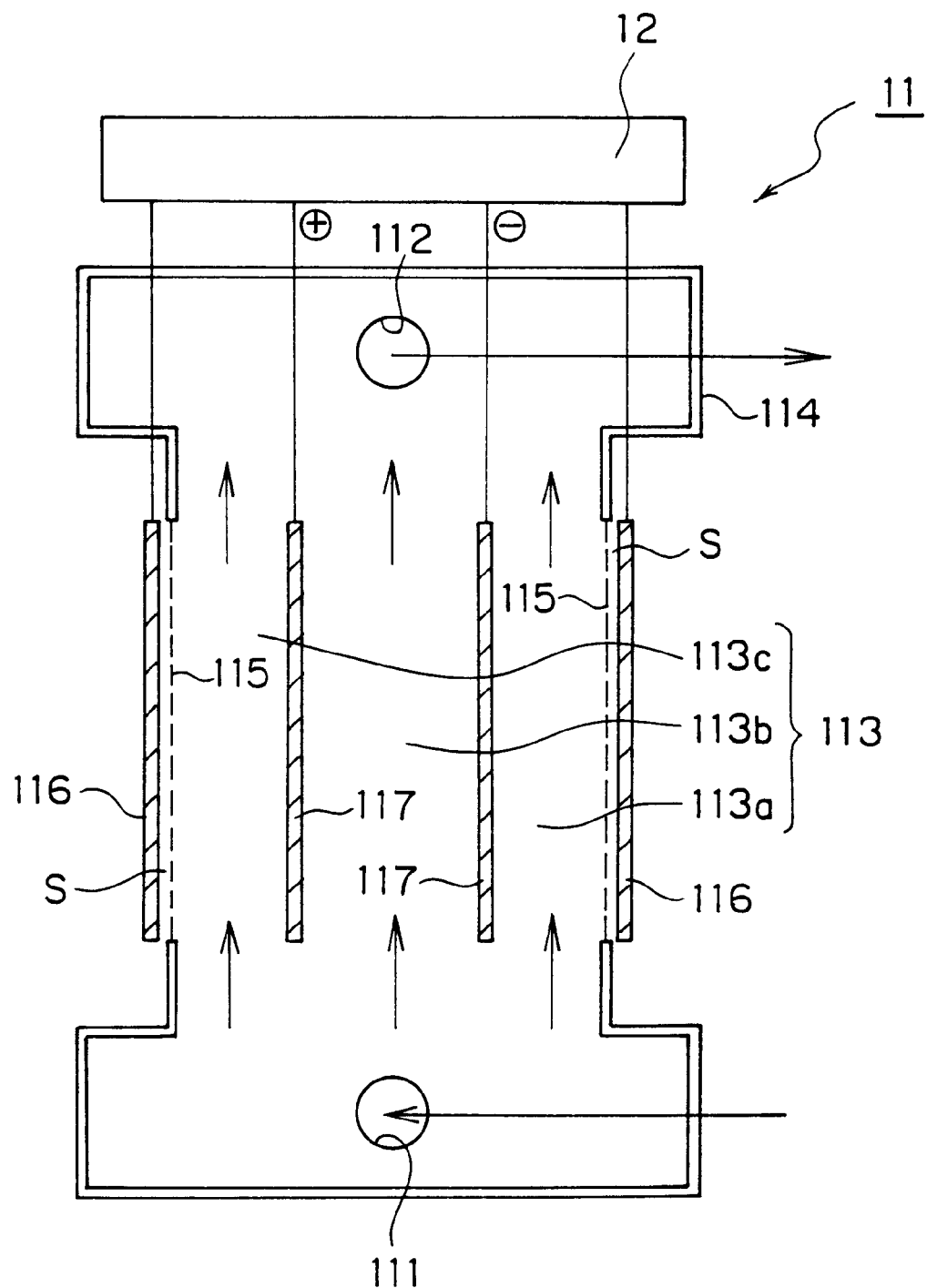

Therefore, the reverse electrolysis descaling of the present embodiment is, as shown in FIGS. 2 and 3, carried out by applying a voltage only to the two electrode plates 117 and 117 provided inside the electrolytic chamber 113 to remove the scale. Namely, as shown in FIG. 2, the polarity of one of the two electrode plates 117 and 117 provided inside the electrolytic chamber 113 (the electrode plate 117 on the left here) is kept to be minus, while the polarity of the other (the electrode plate 117 on the right here) is reversed to be applied a plus voltage first. As a result, a current flows between the two electrode plates 117 and 117 inside the electrolytic chamber 113, so that the scale precipitated on the electrode plate 117 on the right being applied a plus voltage is flown into the tap water.

After continuing this for a certain period of time, as shown in FIG. 3, the application polarity of the two electrode plates 117 and 117 are reversed in turn. Namely, a plus voltage is applied to the electrode plate 117 on the left, a minus voltage is applied to the electrode plate 117 on the left, and by flowing a current between the two electrode plates 117 and 117, the scale precipitated on the electrode plate 117 on the left in turn is removed.

By applying this reverse electrolysis descaling method, the power consumption during the reverse electrolysis descaling becomes half, or time for the reverse electrolysis descaling becomes half when with the same power consumption. Also, since a current does not flow to the electrode plates 116 provided outside the electrolytic chamber 113 during the reverse electrolysis descaling, only anode voltage is applied to the electrode plates 116. Accordingly, it is not necessary to use an expensive plate material able to be used as both polarities in terms of endurance, or in the case of performing precious metal coating, it is possible to make the thickness of the film thinner.

Note that in the above embodiment, a case of generating electrolyzed reducing water was raised as an example for explaining the electrolytic cell 11, however, the electrolytic cell 11 of the present invention can be applied to the case of generating electrolyzed oxidizing water, as well. In the case, it is attained by connecting an anode (+) to the DC power source 12 of the two electrode plates 117 and 117 provided inside the electrolytic chamber 113, connecting a cathode (−)

of the DC power source 12 to the electrode plates 116 and 116 provided outside the electrolytic chamber 113, and applying voltages to the two pairs of mutually facing electrode plates 116 and 117 sandwiching the membrane 115.

Then, when water, such as tap water, is supplied from the inlet 111, the tap water is subjected to electrolysis in the electrolytic chamber 113, and the reaction of the above formula (2) occurs on the surface of the electrode plate 117 and the around, while the reaction of the above formula (1) occurs on the surface of the electrode plate 116 outside the electrolytic chamber 113 over the membrane 115, that is, on the water film between the electrode plate 116 and the membrane 115.

This OH⁻ ion passes the membrane 115 as being permeated therein, and a part of it delivers the electron e⁻ to the cathode plate 117 to become oxygen gas and dissolved in the generated electrolyzed water on the anode side. Due to this, the electrolyzed water generated on the anode side (that is, inside the electrolysis chamber 113) becomes electrolyzed reducing water having a lower oxidation-reduction potential (ORP) than ordinary cases.

Since the residual OH ion passed through the membrane 115 reacts with H+ion in the electrolytic chamber 113 to be reduced to water, the pH of the electrolyzed reducing water generated in the electrolytic chamber 113 becomes a little close to neutral. Namely, electrolyzed reducing water having a not very high pH but a low ORP can be obtained. The electrolyzed oxidizing water including the hydrogen ion generated in this way is delivered from the outlet 112.

The electrolytic cell of the present embodiment will be explained more specifically.

By using the electrolytic cell 11 having the basic configuration shown in FIG. 1, wherein tap water having the pH of 7.9 and the ORP of +473 mV was flown by four litters per minute, a voltage was applied to electrode plates 116 and 117, each having an area of 24 cm², and a constant current of 14 A was provided to carry out electrolysis.

As a membrane 115, a porous film formed by unwoven polyester as the aggregate, poly-fluorinate bynilyden and titanium oxide as the film material, having the thickness of 0.12 mm, an average porous diameter of 0.4 mm, and the permeable water amount of not more than 0.3 cc/cm²·min. was used. The distance between the electrode plates 116 and 117 was set to be 1 mm and the distance between the electrode plates 117 and 117 was set to be 1 mm.

As a result, electrolyzed reducing water having the pH of 9.03 and the ORP of −550 mV was obtained immediately after the generation. Also, when measuring the pH and the ORP of the electrolyzed reducing water being kept still for 5 minutes and 10 minutes and 30 minutes, the results became as shown in Table 1.

According to this, the pH exceeded 9 at the initial stage of the electrolysis, however, it soon lowered and was stabilized at pH=8. The reason for this can be considered that the H⁺ ion generated at the water film between the membrane 115 and the anode plate 116 passed through the membrane 115 and moved to the electrolytic chamber 113 to have neutralizing reaction with OH ion inside the electrolytic chamber 113.

TABLE 1

|  | immediately after electrolysis | 5 minutes later | 10 minutes later | 30 minutes later |
| --- | --- | --- | --- | --- |
| pH | 9.03 | 8.14 | 8.11 | 8.02 |
| ORP (mV) | −550 | −562 | −570 | −571 |

[Second Embodiment]

Figure 4:
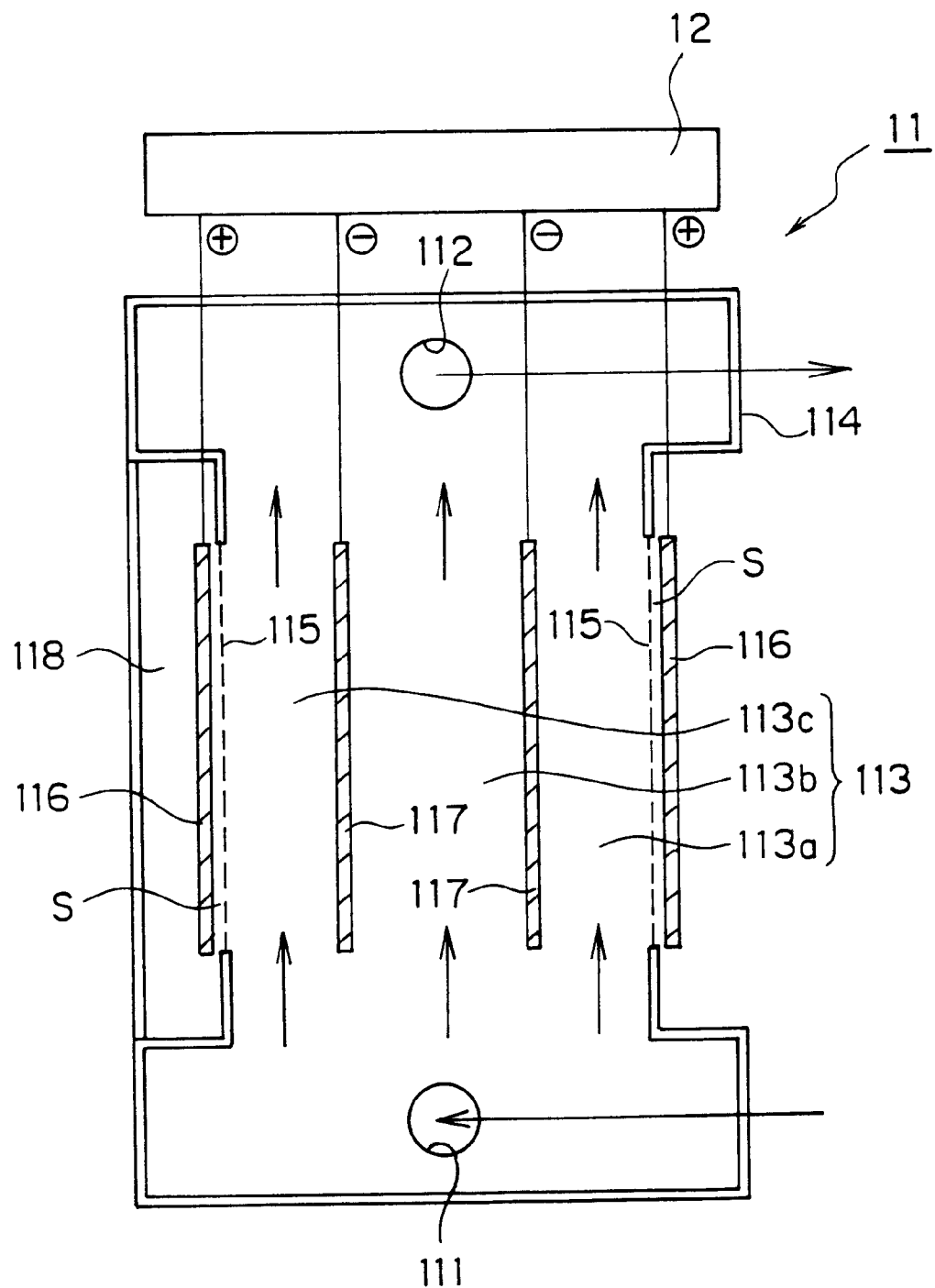
FIG. 4 is a cross-sectional view of a second embodiment of the present invention.

The electrolytic cell of the present invention has the basic configuration shown in FIG. 1, however, when making it fit for practical use, a variety of embodiments can be considered. FIG. 4 is a vertical cross-sectional view of a second embodiment of the present invention, wherein the common members as those in the basic configuration of the electrolytic cell 11 of the present invention shown in FIG. 1 are indicated by the same reference numbers.

In the electrolytic cell 11 of the present embodiment, the different point form the above first embodiment is that one of the electrode plates 116 and 116 provided outside the electrolytic chamber 113 (here, it is the one on the left) is provided in a second electrolysis chamber 118. The second 118 is formed on one side wall of a casing 114 and to which electrolyzing subject water is supplied. The supply of the electrolyzing subject water to the second 118 may be water flowing water or simply filled water subjected to be electrolyzed.

According to the electrolytic cell 11, the electrolyzed reducing water generated by a pair of electrode plates 116 and 117 on the right can be made to have the ORP of peculiarly low in minus without making the pH very high as explained above. Contrary to this, the electrolyzed reducing water generated by the pair of electrode plates 116 and 117 on the left has a high pH and an ORP of largely low in minus.

Accordingly, since mixture of the two kinds of electrolyzed reducing water is delivered from the outlet 112 of the electrolytic cell 11, the combination of the pH and the ORP can be adjusted freely by controlling the current to flow respectively into the pair of the electrode plates 116 and 117 on the right and the pair of the electrode plates 116 and 117 on the left.

This is effective especially when the quality of the electrolyzing subject water is different. For example, the balance of the pH and the ORP of the electrolyzing subject water often largely changes depending on regions and seasons. If the electrolytic cell 11 of the present embodiment is used for such a case, the balance of the pH and the ORP can be controlled to be desired values.

The electrolytic cell 11 of the present embodiment will be further specifically explained.

By using the electrolytic cell 11 having the basic configuration shown in FIG. 4, tap water having the pH of 7.9 and ORP of +473 mV was flown by four litters per minute to the electrolytic chamber 113, while by one litter per minute to the second 118, a voltage was applied to electrode plates 116 and 117, each having an area of 24 cm², and a constant current of 7 A was provided to carry out electrolysis.

As a membrane 115, a porous film formed by unwoven polyester as the aggregate, poly-fluorinate bynilyden and titanium oxide as the film material, having the thickness of 0.12 mm, an average porous diameter of 0.4 μm, and the permeable water amount of not more than 0.3 cc/cm²·min was used. The distance between the electrode plates 116 and 117 was set to be 1 mm and the distance between the electrode plates 117 and 117 was set to be 1 mm.

As a result, electrolyzed reducing water having the pH of 9.57 and the ORP of −657 mV was obtained immediately after the generation. Also, when measuring the pH and the ORP of the electrolyzed reducing water being kept still for 5 minutes and 10 minutes, the results became as shown in Table 2.

Next, the current value flowing to a pair of electrode plates 116 and 117 provided in the second 118 was made to be 3 A and 5 A to generate electrolyzed water under the same condition as above. The result is shown in Table 2.

According to this, by appropriately adjusting the current value flowing to the pair of electrode plates, electrolyzed water having the desired pH and ORP can be generated.

TABLE 2

| current | | Immediately after electrolysis | 5 minutes later | 10 minutes later |
|---|---|---|---|---|
| 7A | pH | 9.57 | 9.50 | 9.46 |
|  | ORP | −657 | −670 | −659 |
| 5A | pH | 9.45 | 9.21 | 9.15 |
|  | ORP | −620 | −565 | −610 |
| 3A | pH | 9.16 | 8.86 | 8.80 |
|  | ORP | −530 | −539 | −539 |

Figure 15:
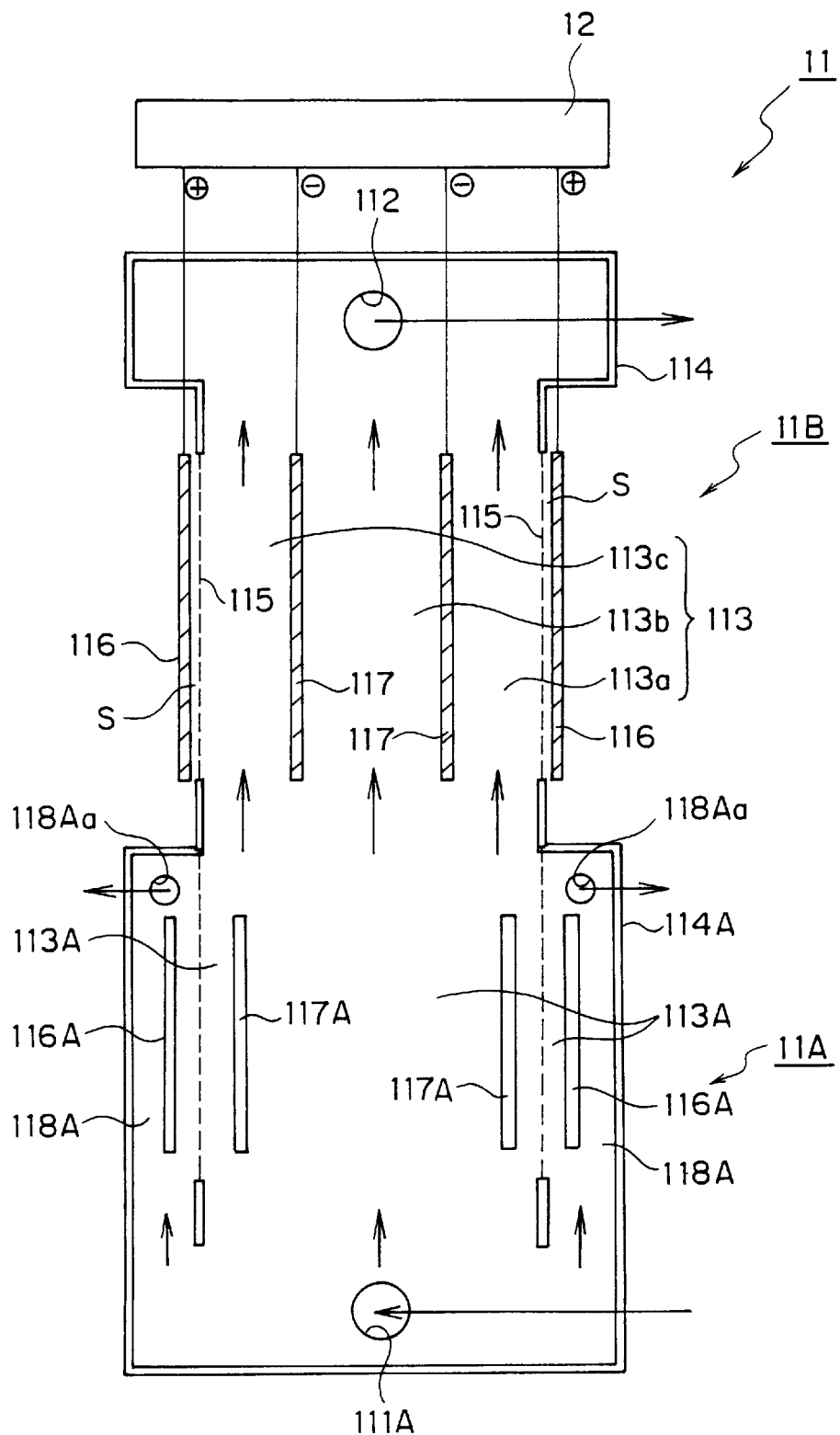
FIG. 15 is a cross-sectional view of a modified example of the second embodiment.

As a modified example of the above second embodiment, it is considered to connect two or more electrolytic cells in series. For example, the electrolytic cell 11 shown in FIG. 15 is a serially connected electrolytic cell wherein a general electrolytic cell of water flowing type 11A (first electrolytic cell) and the electrolytic cell of the first embodiment 11B (second electrolytic cell) are connected in series.

An inlet 111A is formed to which the electrolyzing subject water, such as tap water, is fed at one end of the casing 114A of the first electrolytic cell 11A, and a pair of mutually facing electrode plates 116A and 117A are provided in the casing 114A sandwiching the membrane 115A therebetween. In this example, the membranes 115A and a pair of the electrolytic plates 116A and 117A are provided two sets on both sides of the casing 114A. By this, an electrolytic cell 113A is formed between the two membranes 115A and 115A, and the second electrolytic cells 118A and 118A are formed outside the membranes 115A and 115A.

Note that an outlet 118A$a$ is provided for letting out the electrolyzed water generated at the second electrolysis chamber 118A at the casing 114A positioned in the downstream side of the second electrolysis chamber.

The electrolytic cell 11B of the above first embodiment (refer to FIG. 1) is connected in the downstream side of the first electrolytic cell 11A. The same reference numbers are used for the same members.

As shown in FIG. 15, the first electrolytic cell 11A and the second electrolytic cell 11B are connected in series. When generating electrolyzed reducing water having a small ORP in the electrolytic cell 11, (alkaline) electrolyzed water having a high pH in the first electrolytic cell 11A. And when supplying the generated electrolyzed water as electrolyzing subject water to the second electrolytic cell 11B, it is possible to mainly make the ORP low in minus in the second electrolytic cell 11B. Namely, the pH can be adjusted in the first electrolytic cell 11A and the ORP can be adjusted in the second electrolytic cell 11B. Therefore, the electrolyzed water having a high degree of free combination of a pH and an ORP can be obtained.

[Third Embodiment]

Figure 5:
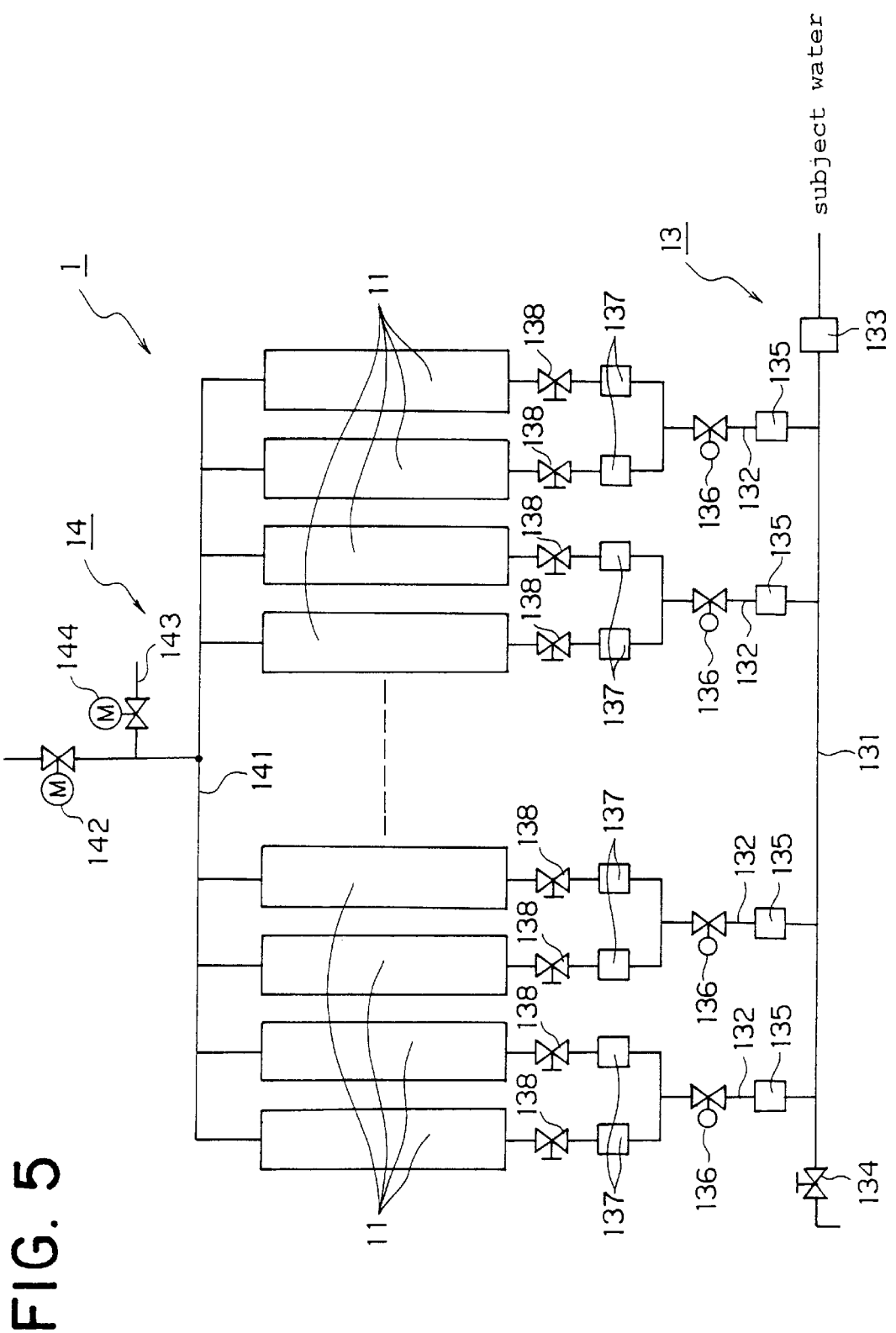
FIG. 5 is a view of the system of a third embodiment of the present invention.

FIG. 5 is the system configuration of an embodiment of the apparatus for producing electrolyzed water 1 configured by using the electrolytic cell 11 of the present invention, wherein the electrolytic cell 11 of the above first and second embodiments are connected in series, and a water supply system 13 for supplying the electrolyzing subject water is provided at the respective inlets 111 of the electrolytic cell 11.

The water supply system 13 is composed of a main water 46 pipe 131 and a plurality of branch water pipes 132 branching therefrom. A strainer 133 for filtering any impure ingredients in the electrolyzing subject water is provided in the main water pipe 131, and a manual valve 134 is provided at the end to form a drain.

The respective branch water pipes 132 are provided with a decompressor valve 135 and an electromagnetic valve 136. The branch water pipes are further branched ahead of the valves, to which a constant flow amount valves 137 and manual valves 138 are provided.

On the other hand, a water take-in system 14 is provided at the outlet 112 of the electrolytic cells 11 arranged in parallel. The water sluice system 14 is composed of a main water sluice pipe 141 for putting the respective outlets 112 of the electrolytic cells 11 together, an electronic valve 142 provided at the end thereof, drain pipes 143 branched from the main water take-in pipe 141, and an electronic valve 144 provided to the drain pipe 143.

Note that a DC power source 12 shown in FIG. 1 or 4 is connected to the respective electrolytic cells 11, illustration of which is omitted.

To generate the desired electrolyzed water by using such an apparatus for producing electrolyzed water 1, first, the manual valve 134 at the end of the main water pipe 131 is closed and the manual valves 138 of the respective branch water pipes 132 are left open. Then, the original water is supplied to the main water pipe 131, the electromagnetic valve 136 of the respective branch water pipes 132 and the electronic valve 142 of the water sluice system 14 are controlled.

Though it is not especially limited, as an example of an operation method, it is preferable that the reverse electrolysis descaling is carried out to any one of the electrolytic cells 11 one by one. Namely, when being controlled that always one of the electrolytic cell 11 is to be carried out the reverse electrolysis descaling, and the remaining electrolytic cells 11 are to be generating electrolyzed water, the water quality of the electrolyzed water taken from the water sluice system 14 becomes always constant.

[Fourth Embodiment]

Figure 6:
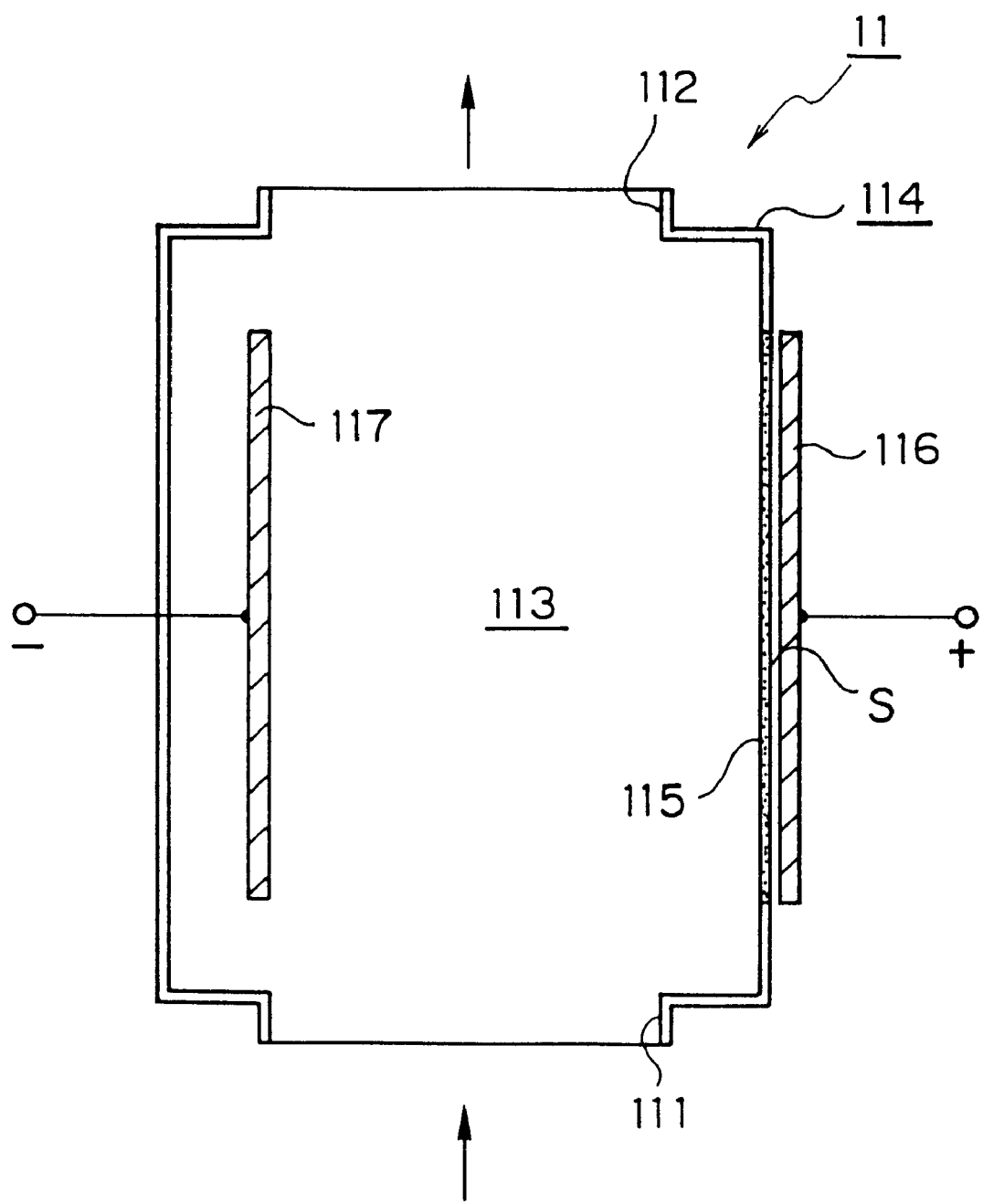
FIG. 6 is a cross-sectional view of a fourth embodiment of the present invention.

FIG. 6 is a cross-sectional view of a fourth embodiment of the electrolytic cell 11 of the present invention, wherein the common members to those in the basic configuration of the electrolytic cell 11 shown in FIG. 1 are indicated by the same reference numbers. The present example is different from the first embodiment in the point that only one set of the membrane 115 and the electrode plates 116 and 117 are provided.

Basically, the same effectiveness can be obtained as in the above first embodiment by using such an electrolytic cell 11. The present embodiment will be further specifically explained.

As an example 1, by using the electrolytic cell having the basic configuration shown in FIG. 6, electrolysis was carried out by flowing tap water having the pH of 7.2 and the ORP of +450 mV by four litters per minute, and applying a voltage of 30V. A current flown to both the electrode plates 116 and 117 was 4 A (120 W). As a membrane 115, a porous film formed by unwoven polyester cloth as the aggregate, poly-fluorinate bynilyden and titanium oxide as the film material, having the thickness of 0.12 mm, an average porous diameter of ~0.4 μm, and the permeable water amount of not more than 0.3 cc/cm²·min. was used. The distance between the electrode plates 116 and 117 was set to be 1 mm.

Figure 7:
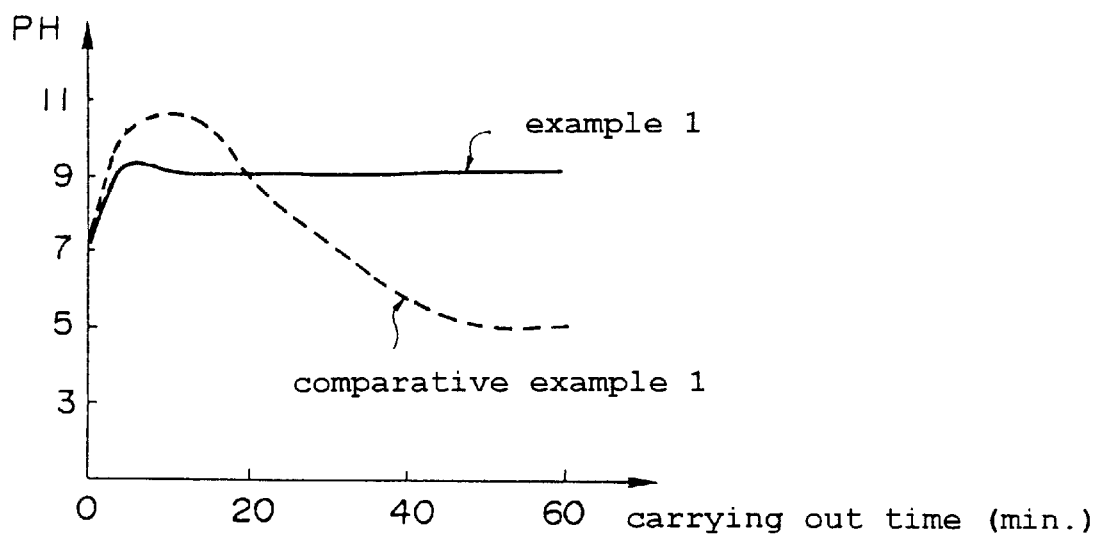
FIG. 7 is a graph showing the change of a pH value with respect to the continuous operation time.
Figure 8:
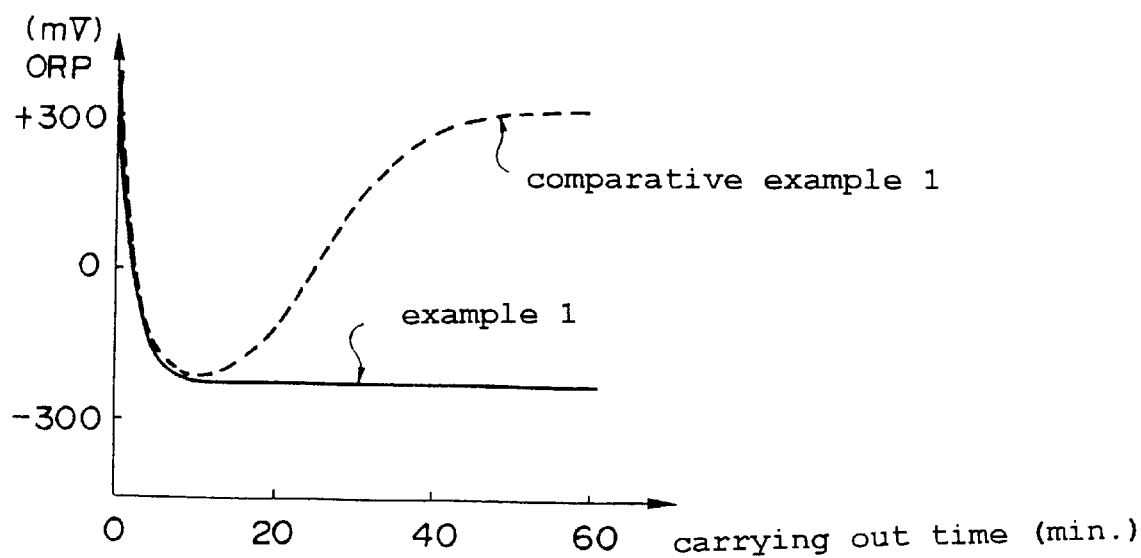
FIG. 8 is a graph showing the change of an ORP with respect to the continuous operation time.

As a result, electrolyzed reducing water having the pH of 8 to 9 and the ORP of −220 mV was obtained. Also, the electrolysis was continued for one hour, however, the values of the pH and ORP hardly changed as shown in FIGS. 7 and 8 (refer to the example 1). Note that the electrolyzed water having the pH exceeding 9 was obtained at the initial stage of the electrolysis as shown in FIG. 7, however, it soon lowered and became stable at the pH of 9. The reason for this can be considered that the $H^+$ ion generated at the water film between the membrane 115 and the anode plate 116 passed through the membrane 115 and moved to the electrolytic chamber 113 to have neutralizing reaction with OH ion inside the electrolytic chamber 113.

Figure 9:
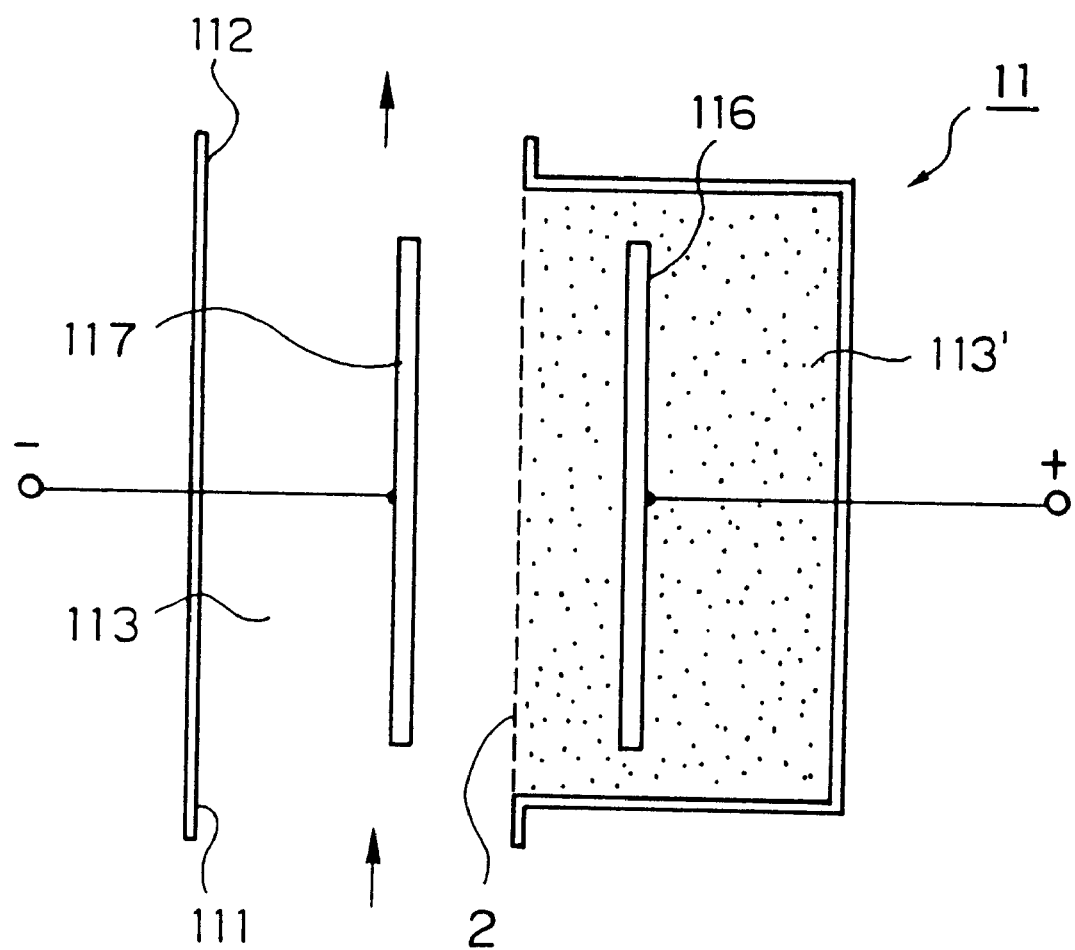
FIG. 9 is a vertical cross-sectional view of an electrolytic cell of the related art used as a comparison example.

As a comparative example 1 to this, an electrolyzing cell having an electrolytic chamber 113' also on the side of the electrode plate 116 and wherein the distance between the electrode plate 116 and the membrane 115 is long (0.5 mm) as shown in FIG. 9 was prepared to carry out electrolysis by flowing tap water having the pH of 7.2 and the ORP of +450 mV by four litters per minute and applying a voltage of 12V. A current flown to both the electrode plates 116 and 117 was 10 A (120 W). The same membrane 115 as in the embodiment 1 was used, the distance between the electrode plates 116 and 117 was set to be 1 mm, and the membrane 115 was set to be positioned at the center.

As a result, alkaline electrolyzed water having the pH of 8 to 9 and the ORP of −220 mV was obtained at the initial stage of the electrolysis. However, when the electrolysis was continued for one hour, the pH and the ORP began to fluctuate after 20 minutes and the electrolysis was not able to be continued furthermore as shown in FIGS. 7 and 8. It is considered that the reason is that inside the electrolytic chamber 113' became saturated with the electrolyzed oxidizing water.

Note that as an example 2, electrolysis was carried out under the same conditions as in the example 1 except that the polarity of the applied voltage to the electrode plates 116 and 117 was reversed and that tap water having the pH of 7.4, the ORP of +350 mV and the DO (dissolved oxygen content) of 6.4 ppm was used as the electrolyzing subject water. The electrolysis was continued for one hour and the stable electrolyzed oxidizing water having the pH of 6.9, the ORP of +560 mV and the DO of 10.0 ppm could be obtained.

Figure 10:
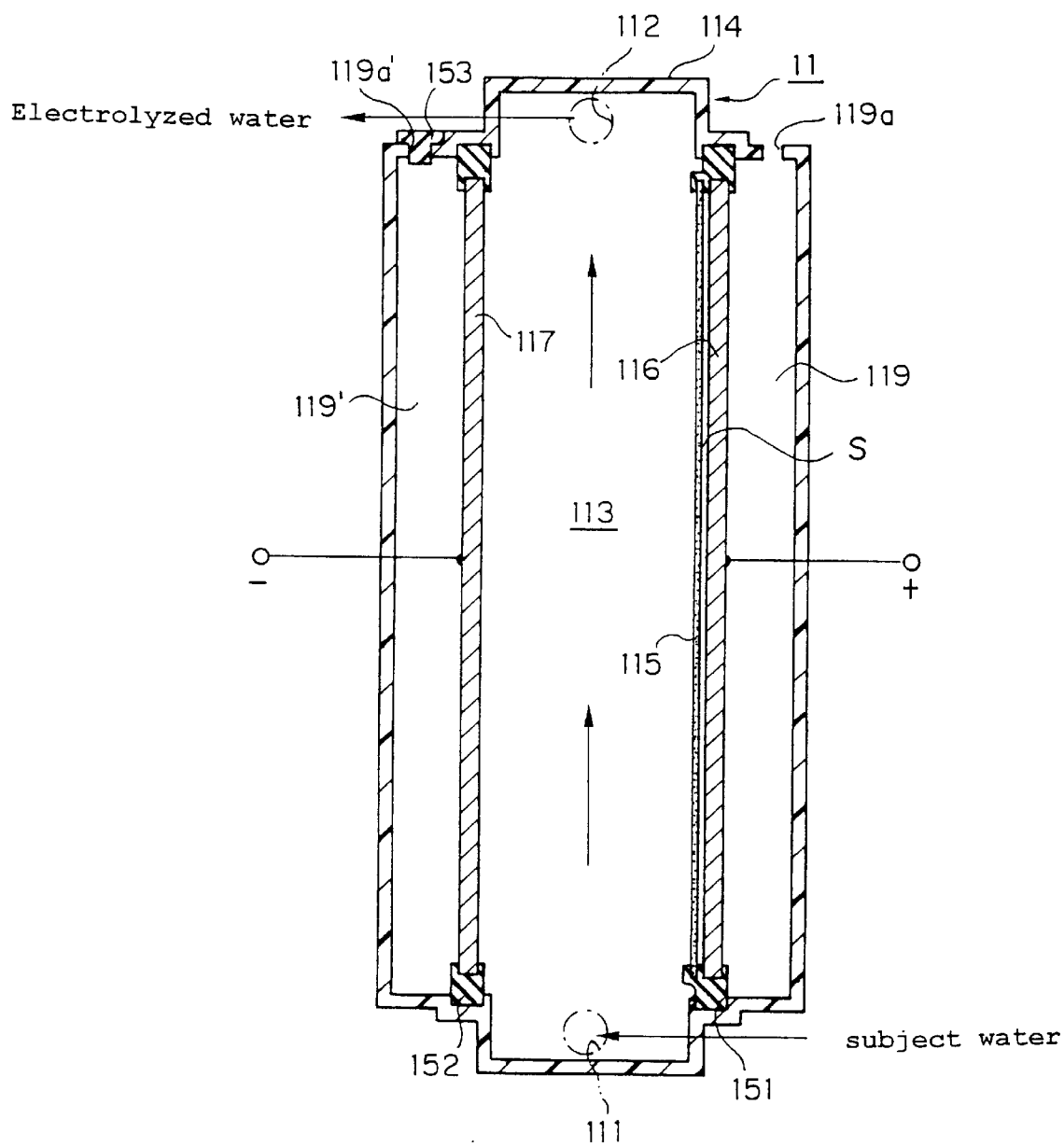
FIG. 10 is a vertical cross-sectional view of specific example of the fourth embodiment of the present invention.
Figure 11:
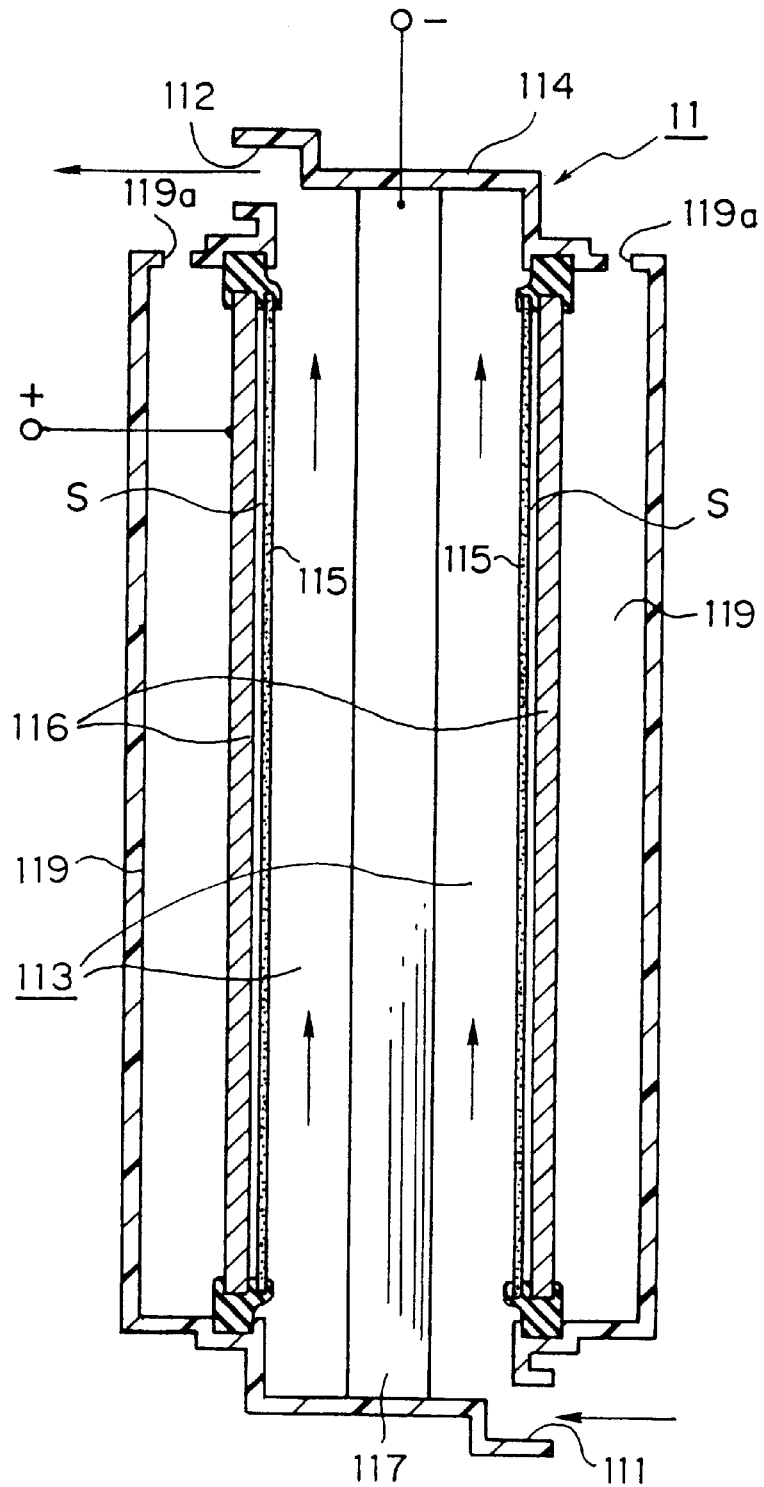
FIG. 11 is a vertical cross-sectional view of another specific example of the fourth embodiment of the present invention.

When practically using the electrolytic cell of the fourth embodiment, a variety of forms can be considered. FIG. 10 is a vertical cross-sectional view of an example thereof, and FIG. 11 is a vertical cross-sectional view of another example, wherein the common members to those in the basic configuration of the electrolytic cell of the present invention shown in FIG. 1 are indicated by the same reference numbers.

The electrolytic cell 11 shown in FIG. 10 has a casing 114 formed to have a rectangular parallelepiped vertical cross-section, wherein an inlet 111 for electrolyzing subject water (specifically, a pipe for letting in the original water) is provided extending in the vertical direction with respective to the paper surface at the low end, and in the same way, an outlet 112 for the electrolyzed water (specifically, a pipe for letting out the electrolyzed water) is provided extending in the vertical direction with respective to the paper surface at the upper end.

Also, in the electrolytic cell 11, a pair of electrode plates 116 and 117 are fixed, further, a membrane 115 is installed on the electrode plate 116, for example, as if the two are united as one. Between the electrode 117 and the membrane 115 becomes an electrolytic chamber 113, and a space S is formed between the membrane 115 and the electrode plate 116 configured as if being united, wherein the water exists, as well.

To combine the electrode plate 116 and the membrane 115 as if being united as one, as well as to secure the water tightness with a gas chamber 119 which will be explained later on, a packing 151 is fitted around the electrode plate 116 and the membrane 115. Also, in order to fix the electrode plate 117 to the casing 114 of the electrolytic cell 11, a packing 152 is fitted around the electrode plate 117.

Especially in the electrolytic cell 11 of the present embodiment, a gas chamber 119 is formed outside the electrolytic chamber 113 and the gas generated on the surface on the side of the electrode plate 116, that is in the space S, can be collected effectively to the gas chamber 119. The reference number "119*a*" indicates an outlet for letting out the gas emitted to the gas chamber 119 to the desired part.

Note that a chamber 119' is formed on the back surface of the electrode plate 117 being out of contact with the membrane 115, which is not essential and can be omitted. However, by making the electrolytic cell 11 in a symmetric form, it can be preferably used to heighten the compatibility of the anode and the cathode. For example, when preparing an apparatus which can generate both electrolyzed reducing water and electrolyzed oxidizing water, it is sufficient to provide a circuit for reversing polarity to an applying circuit to the electrode plates 116 and 117. When such a circuit cannot be provided, it can be handled by exchanging the unit of the electrode plate 116 and the membrane 115 with the electrode plate 117 shown in FIG. 7. Note that in this case, the outlet 119*a'* opened at the upper portion of the chamber 119' is not necessary, so that it may be closed with a plague 153, etc.

On the other hand, a cylinder-shaped casing 114 is applied in the electrolytic cell 11 shown in FIG. 11. In accordance with the cylinder-shaped casing 114, the electrolytic cell 11 has a cylinder-shaped electrode plate 116 the upper and lower ends thereof are open and a cylinder-shaped membrane 115 the upper and lower ends thereof are open in the same way and in contact with the electrode plate 116. Further, an electrode bar 117, for example, in the shape of solid (not hollow) is provided at the center of the electrolytic chamber 113.

An inlet 111 for the original water to be electrolyzed is provided at the lower end of the electrolytic cell 11, an outlet 112 for electrolyzed water is provided at the upper end. The original water to be electrolyzed fed from the inlet 111 passes thorough the cylinder-shaped electrolytic chamber 113 formed between the electrode bar 117 and the cylinder-shaped membrane 115, to be electrolyzed, and then taken out from the outlet 112.

A gas chamber 119 which is the same as in the above example shown in FIG. 10 is formed outside the electrolytic cell 11 to entirely surrounding it, and the gas generated at the cylinder-shaped space S (water film is formed here) formed by the cylinder-shaped membrane 115 and the cylinder-shaped electrode plate 116 is collected to be discharged from the outlet 119*a*.

The same effectiveness can be obtained by such a cylinder-shaped electrolytic cell 11.

[Fifth Embodiment]

Figure 12:
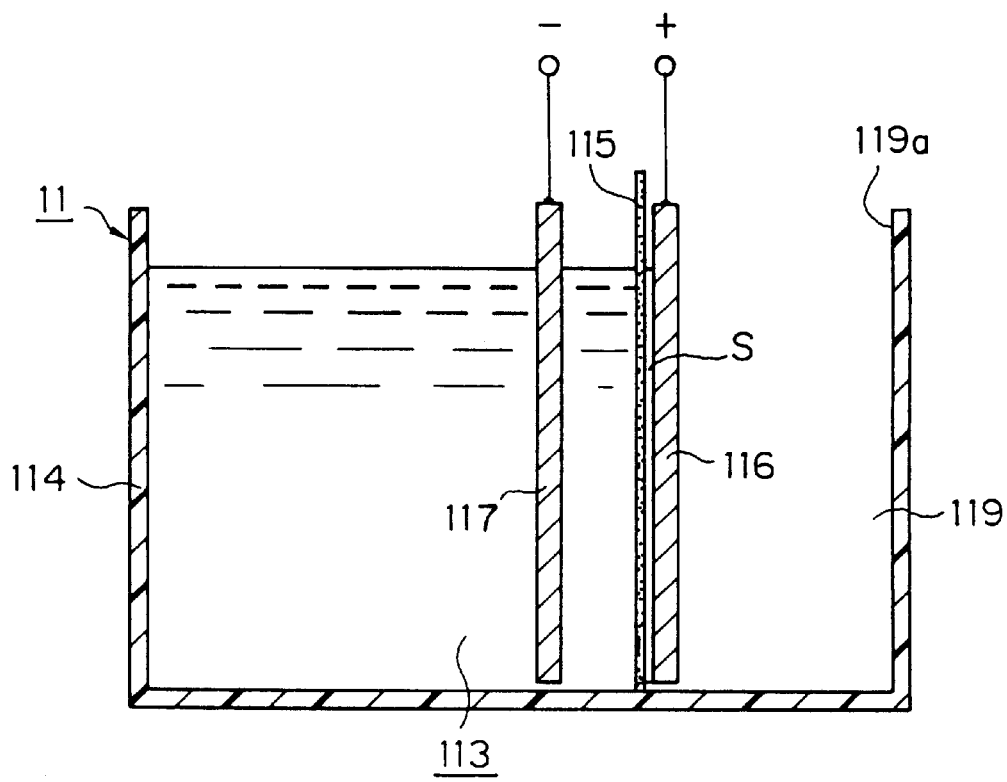
FIG. 12 is a vertical cross-sectional view of a fifth embodiment of the present invention.

The above first to fourth embodiments are examples wherein the present invention were applied to a water flowing type electrolytic cell, while the present invention can be applied to a batch type electrolytic cell, as well. FIG. 12 is a schematic view of the basic configuration of when the electrolytic cell of the present invention is applied to a batch type electrolytic cell, wherein the common members to those in the basic configuration shown in FIG. 1 are indicated by the same reference numbers. The electrolyzed reducing water or electrolyzed oxidizing water having the aimed properties, especially, a large absolute value of the ORP without depending on the pH value can be also generated for a long time by this kind of batch type electrolytic cell.

[Sixth Embodiment]

The apparatus for producing electrolyzed water having the electrolytic cell of the present invention can be applied to the case of generating a large amount of electrolyzed water by circulating the original water to be electrolyzed fed in a storage tank in addition to supplying electrolyzed water on the real-time.

Figure 13:
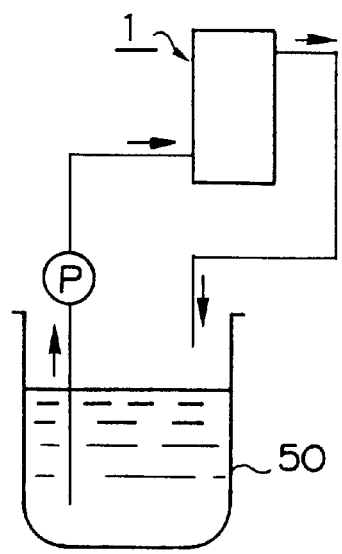
FIG. 13 is a view of the system of a sixth embodiment of the present invention.

FIG. 13 is a view of a sixth embodiment of the apparatus for producing electrolyzed water of the present invention, which is an application of the present invention for a portable water. The electrolyzed reducing water can be used as a replacement of portable water for domestic use and industrial use. In this case, tap water is stored in a storage tank 50 as shown in the same figure, supplied to the apparatus for producing electrolyzed water 1 of the present invention by a pump P, electrolyzed to generate the electrolyzed reducing water as explained above and returned to the storage tank 50. When continuing this circulation for a certain period of time, the electrolyzed reducing water having a pH close to neutral and a low ORP can be obtained.

To explain more specifically, electrolysis was carried out by supplying 20 liters of tap water having the pH of 7.2, the ORP of +450 mV and the DO of 7.0 to the storage tank 50, operating the pump for 25 minutes by using the apparatus for producing electrolyzed water having the electrolytic cell explained in the fourth embodiment, and circulating the water in the storage tank 50 to the electrolyzed water generating apparatus 1. The generating amount by the electrolyzing water generating apparatus 1 was four liters per minute and the current flown between the electrode plates was 10 A (constant). When measuring the pH, ORP (mV) and DP (ppm) of the electrolyzed water stored in the storage tank 50, the result shown in Table 3 was obtained and the electrolyzed water having a low ORP, which affects cleaning capability, was generated.

TABLE 3

| Electrolyzing time | 0 minute | 5 minutes | 10 minutes | 15 minutes | 20 minutes | 25 minutes |
|---|---|---|---|---|---|---|
| pH | 7.20 | 8.33 | 8.44 | 8.85 | 8.85 | 8.80 |
| ORP | +450 | −250 | −330 | −367 | −420 | −450 |
| DO | 7.00 | 2.70 | 2.60 | 2.14 | 2.20 | 1.76 |

Note that the embodiments explained above are described for easier understanding of the present invention and not to limit the present invention. Accordingly, the respective elements disclosed in the above embodiments includes every modification in designing and equivalent subjects belong to the technical range of the present invention.

What is claimed is:

1. An electrolytic cell, comprising:
   an electrolytic chamber to which subject water is supplied, and at least a pair of electrode plates having a first electrode plate and a second electrode plate; said first electrode plate provided inside said electrolytic chamber; and said second electrode plate provided outside said electrolytic chamber; a membrane sandwiched between said first electrode plate and said second electrode plate; and said electrolytic cell,
   wherein said second electrode plate located outside said electrolytic chamber is provided in contact with the membrane or leaving a slight space.

2. An electrolytic cell as set forth in claim 1, wherein the membrane and said pair of electrode plates are provided at least two sets.

3. An electrolytic cell as set forth in claim 2, wherein one of the electrode plates outside of said electrolytic chamber is provided in a second electrolytic chamber.

4. An electrolytic cell as set forth in any one of claims 1 to 3, comprising a means for applying a voltage of either one of an anode or a cathode to said electrode plate provided inside of said electrolytic chamber and a power source circuit for applying a voltage of the other one of the anode or the cathode to said electrode plate provided outside of said electrolytic chamber.

5. An electrolytic cell as set forth in claim 4, wherein said power source circuit has a reverse descaling circuit for carrying out a first reverse descaling by applying a voltage of either one of an anode or a cathode to one of said electrode plates provided outside of said electrolytic chamber, and simultaneously applying a voltage of the other one of the anode or the cathode to the other one of said electrode plates, and thereafter, carrying out a second reverse descaling by reversing the polarity of the applying voltage to said electrode plates.

6. An electrolytic cell as set forth in claim 5, wherein said reverse descaling circuit does not apply a voltage to said electrode plate outside said electrolytic chamber during said first and second reverse descaling.

7. An electrolytic cell comprising: a first electrolytic cell having a first electrolytic, chamber and a second electrolytic chamber adapted to be filled by subject water and separated by a membrane and at least a pair of electrode plates sandwiching the membrane therebetween respectively provided in said first electrolytic chamber and said second electrolytic chamber;
   a second electrolytic cell having a third electrolytic chamber to which electrolyzed water produced in said first electrolytic chamber of said first electrolytic cell is supplied, at least a pair of electrode plates sandwiching a membrane therebetween respectively provided inside of said third electrolytic chamber and outside of said third electrolytic chamber; and said electrolytic cell wherein said electrode plate outside of said third electrolytic chamber is provided in contact with said membrane or leaving a slight space.

8. An apparatus for producing electrolyzed water, comprising: a plurality of electrolytic cells as set forth in any one of claims 1–3 and 7, a water supply system for letting in the subject water in parallel to the respective electrolytic chambers of said electrolytic cell, and a water sluice system for letting out in parallel the electrolyzed water produced in said respective electrolytic chambers.

9. A descaling method of an electrolytic cell comprising an electrolytic chamber to which subject water is supplied and at least two pairs of electrode plates, each pair of electrode plates having a first electrode plate provided inside of said electrolytic chamber and a second electrode plate provided outside of said electrolytic chamber; a membrane being sandwiched between said first electrode plate and said second electrode plate, said method comprising the steps of:

a first reverse descaling step for carrying out by applying a voltage of either one of an anode or a cathode to one of said electrode plates provided inside said electrolytic chamber, and simultaneously applying a voltage of the other one of the anode or the cathode to the other one of said electrode plates, and a second reverse descaling step for carrying out by reversing the polarity of the applying voltage to said electrode plates.

10. A descaling method of an electrolytic cell as set forth in claim 9, wherein a voltage is not applied to an electrode plate provided outside of said electrolytic chamber during said first and second reverse descaling steps.

* * * * *